April 7, 1925.
A. FLAD ET AL
1,532,241
METERING CIRCUIT FOR TELEPHONE SYSTEMS
Filed July 10, 1922
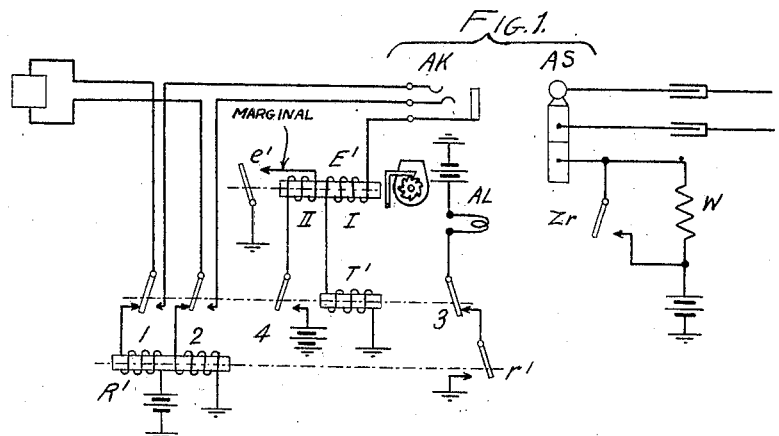
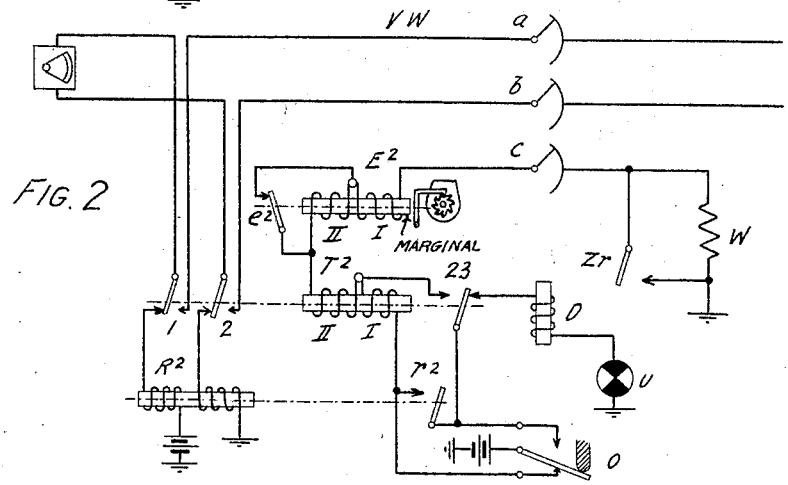
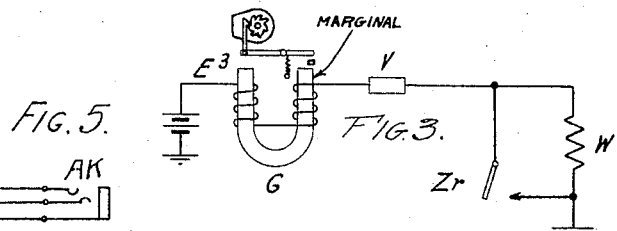
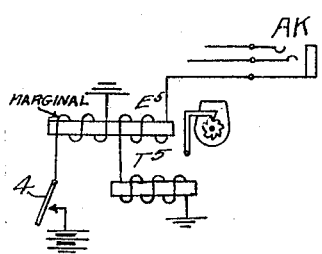
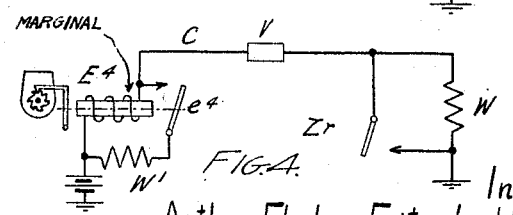
Inventors:
Arthur Flad — Fritz Lubberger.
Chas. W. Candy Atty.

Patented Apr. 7, 1925.

1,532,241

UNITED STATES PATENT OFFICE.

ARTHUR FLAD, OF BERLIN, AND FRITZ LUBBERGER, OF SCHMARGENDORF, GERMANY, ASSIGNORS TO SIEMENS & HALSKE AKTIENGESELLSCHAFT, OF SIEMENSSTADT, NEAR BERLIN, GERMANY.

METERING CIRCUIT FOR TELEPHONE SYSTEMS.

Application filed July 10, 1922. Serial No. 573,957.

*To all whom it may concern:*

Be it known that we, ARTHUR FLAD, a German citizen, and a resident of Rhinowerstrasse 2, Berlin, Germany, and FRITZ LUBBERGER, a German citizen, and a resident of Charlottenbrunnerstra. 5, Schmargendorf, Germany, have invented certain new and useful Improvements in Metering Circuits for Telephone Systems, of which the following is a specification.

The present invention relates to an improved meter crcuit for telephone systems, in which the meter is operated by directly altering the strength of the current passing through its windings.

Hitherto, so far as applicants are aware, it has been impossible to repeatedly operate such meters at predetermined intervals of time during a conversation, because the current continuously passing through the meter during a conversation would be sufficient to retain the meter in its operated position, even after the cessation of the increase of current that forms the metering impulse. Hence in a meter circuit of this type, the armature of the meter could only be returned to its normal position when the connection was released.

According to the present invention the above mentioned disadvantage is obviated by providing the magnet controlling the meter with means for releasing its armature when the current passing through the magnet is reduced at the end of the metering impulse. This means comprises an arrangement for altering the strength of the magnetic field of the meter magnet. This can be effected, for instance, by an additional winding, a resistance or an additional electromagnet.

Preferably the magnet operates the armature when the metering impulse is received by the magnet, and then controls a contact device for abnormally reducing the strength field in order to release the armature in a reliable manner on the cessation of the metering impulse.

The drawing shows by way of example, various methods of carrying out the invention.

Figs. 1 and 2 show different circuits for releasing the armature of the meter magnet by means of an opposing winding.

Fig. 3 shows a circuit for a polarized meter magnet.

Fig. 4 shows an arrangement, in which the meter magnet releases its armature when the strength of the magnet is weakened by connecting up a resistance.

Fig. 5 shows a modification of Fig. 1.

The circuit of Fig. 1 is arranged for a manual system, in which connections are set up over jacks and plugs. The electro-magnet $E^1$ is directly controlled by the metering impulse and has two differentially wound windings. Of these the winding I is connected to the bush of the jack AK and is traversed by current throughout the duration of a connection. When the calling subscriber lifts his receiver, a circuit is closed over both windings of the relay $R^1$, which is energized and at its contact $r^1$, closes a circuit for the line lamp AL, extending from battery over lamp AL, contact of armature 3, of relay $T^1$, contact $r^1$ of relay $R^1$ to earth. Thus the lamp is lighted. When the operator inserts the plug AS into the jack AK, the relay $T^1$ is energized in the following circuit: battery, resistance W, sleeve of plug AS, bush of the jack AK, winding I of the electro-magnet $E^1$, relay $T^1$, earth. This current, however, is not strong enough to operate the electro-magnet $E^1$. But the relay $T^1$ is operated, and at its armatures 1 and 2 switches the subscriber's line over from the relay $R^1$ to the jack AK, while at armature 3 it extinguishes the calling lamp $A^1$, and at contact 4 prepares a circuit for the differential winding II of the electro-magnet $E^1$.

After the connection has been established, the contact $zr$ is momentarily closed. This can, for instance, be effected by a time switch after a given time, or may be manually controlled by the operator. Thus the resistance W is short-circuited so that the current passing over winding I of the electro-magnet $E^1$ is increased sufficiently to cause the armature to move into its operated position, and close at contact $e^1$ the circuit for winding II of the electro-magnet $E^1$, which was previously prepared at the contact 4. The field generated by this winding neutralizes that generated by winding I after the current through the latter has decreased in consequence of the opening of contact $zr$, so that the armature of the electro-magnet $E^1$ returns into its normal position. During this return movement, the counting device on the meter is advanced in the well-known manner. At the same time the circuit of the differential winding II is opened at contact $e^1$ and the electro-magnet $E^1$ is made ready for the next metering impulse.

In the modification shown in Fig. 5, the same result is obtained by closing the circuit of the opposing winding II of the electro-magnet $E^5$ when the call is answered instead of when the electro-magnet is operated. In this case the winding is energized when its circuit is closed at armature 4. The field generated in the electro-magnet $E^5$ by the normal current passing over the bush of the jack is neutralized by that generated in the opposing winding. When this normal current is increased by the transmission of the metering impulse over $zr$, the field generated by the winding I exceeds that generated by winding II, so that the electro-magnet $E^5$ operates the meter. When the current is decreased by opening contact $zr$, the field is neutralized so that the electro-magnet $E^5$ is immediately de-energized.

The electro-magnet $E^1$ either directly operates the counting mechanism, or the arrangement can be such that the magnet forms a relay, which controls the circuit of a separate meter.

Fig. 2 shows the application of the invention to an automatic telephone system. The electro-magnet $E^2$ has its windings I and II connected in series to the test lead. The winding II serves as an opposing winding and is normally short-circuited by armature contact $e^2$. The strength of the field produced by the opposing winding II is such that it approximately counter-balances the strength of the field produced by the winding I, when traversed by circuit normally passing over the test lead.

When the subscriber originates a call, his line relay $R^2$ is energized, and at contact $r^2$ closes the following circuit for the rotary magnet of the pre-selector VW:—earth, interrupter U, rotary magnet D, back contact of armature 23, armature $r^2$ off-normal contact $o$, battery. The wipers, $a$, $b$ and $c$ of the pre-selector are thereby rotated step by step until they reach a free trunk line. Thereupon the relay $T^2$ is energized in the following circuit: earth, resistance W, wiper $c$, winding I of the magnet $E^2$ contact $e^2$, windings II and I of relay $T^2$, front contact of armature $r^2$, off normal contact $o$ in its operated position, battery.

The relay $T^2$ at its contacts 1 and 2 switches the calling subscriber's line over from the relay $R^2$ to the switch wipers $a$ and $b$, so that relay $R^2$ is de-energized and contact $r^2$ is again opened. Furthermore, relay $T^2$ at its armature 23 opens the circuit of the motor magnet D, and connects its winding I in the following holding circuit:—Battery, off-normal contact $o$ in its operated position, front contact of armature 23, winding II of the relay $T^2$, armature $e^2$, winding I of magnet $E^2$, wiper $c$, resistance W, earth.

The field generated due to the passage of current through the winding I of the magnet $E^2$ and over the resistance W is not strong enough to operate its armatures out of their normal position. But when the metering impulse is transmitted by the closure of contact $zr$, the current through winding I is increased to such an extent that these armatures are attracted, the armature $e^2$ removes the short-circuit around the winding II, which is now energized and generates a field in opposition to that generated by winding I. When thereupon the contact $zr$ is again opened and the current through the magnet $E^2$ is decreased, the effect of the opposing winding causes the magnet $E^2$ to release its armature, thereby closing the contact $e^2$ and advancing the counting mechanism of the meter.

Fig. 3 shows an arrangement for a manual or automatic telephone system, in which a polarized electro-magnet $E^3$ is used, which is actuated by metering current. When the contact $zr$ is open, the current flowing over the resistance W and through the magnet in $E^3$ generates a field, which neutralizes the field due to the permanent magnet G. When the contact $zr$ is closed, the current through the winding $E^3$ is so increased, that the field generated exceeds that of the permanent magnet. Hence the polarity is reversed and the armature is attracted. At the end of the metering impulse, when the current is decreased due to the opening of contact $zr$, the permanent magnet G ensures the release of the armature.

Fig. 4 shows a circuit arrangement, in which a resistance $W^1$ is connected in parallel with the electro-magnet $E^4$. An increase of current is due to the closure of contact $zr$ causes the magnet $E^4$ to close the contact $e^4$, and thereby connect the resistance $W^1$ in parallel with the winding of the magnet. This reduces the current through the winding to such an extent that the magnet $E^4$ releases its armature when the current over the test lead $c$ is decreased by the opening of contact $zr$. Thereupon the resistance $W^1$ is disconnected, so that only the normal current now flows through the winding of magnet $E^4$.

What we claim and desire to protect by Letters Patent is:—

1. The combination, with a subscriber's line, of a meter and cut off relay for said line, a curcuit including said meter and cut off relay in series, said meter being nonresponsive to normal current flow in said circuit, means for temporarily increasing the current flow in said circuit to operate said meter, and means controlled by the operating magnet of said meter for opposing the effect of the increased current after the magnet has operated in order to facilitate the deenergization of the magnet when the current is reduced to its normal value.

2. In combination, a circuit, a meter magnet in said circuit non-responsive to normal current flow, means for increasing the current flow in said circuit to operate said meter magnet, and means actuated by said magnet for reducing its magnetization so that when the current in said circuit again becomes normal the magnetization will be less than its initial value.

3. In combination, a meter, a magnet having an armature for operating said meter, means for initially magnetizing said magnet to a limited degree insufficient to attract said armature, means for increasing the magnetization sufficient to attract said armature, and means operated by said magnet for reducing its magnetization so as to facilitate the release of said armature when the said second magnetizing means becomes ineffective.

4. In combination, a circuit, a meter magnet having a winding in said circuit, said magnet non-responsive to normal current flow in said circuit, means for increasing the current flow in said circuit to effectively energize said magnet, a differential winding for said magnet included in a local circuit, and contacts operated by said magnet for closing said local circuit.

5. In a telephone system, a double wound meter control magnet, a meter, an operating circuit for said magnet including only one winding, means for closing said circuit without effecting said magnet, means for momentarily increasing the current flow through said winding to operate said magnet to cause the meter to register, and a circuit through the other winding of said magnet completed by its operation and effective to cause said magnet to deenergize when the increased current flow through the first winding is discontinued.

6. In a telephone system, a differentially wound meter control magnet, a normally ineffective circuit for one winding of said magnet, means for momentarily increasing the current flow through said circuit to cause said magnet to operate, and means responsive to the operation of said magnet for closing a circuit through its other winding to effect the restoration of said magnet when the increased flow in the first winding is discontinued.

Signed by us at Berlin, Germany, this 13th day of June, 1922.

ARTHUR FLAD.
FRITZ LUBBERGER.